UNITED STATES PATENT OFFICE.

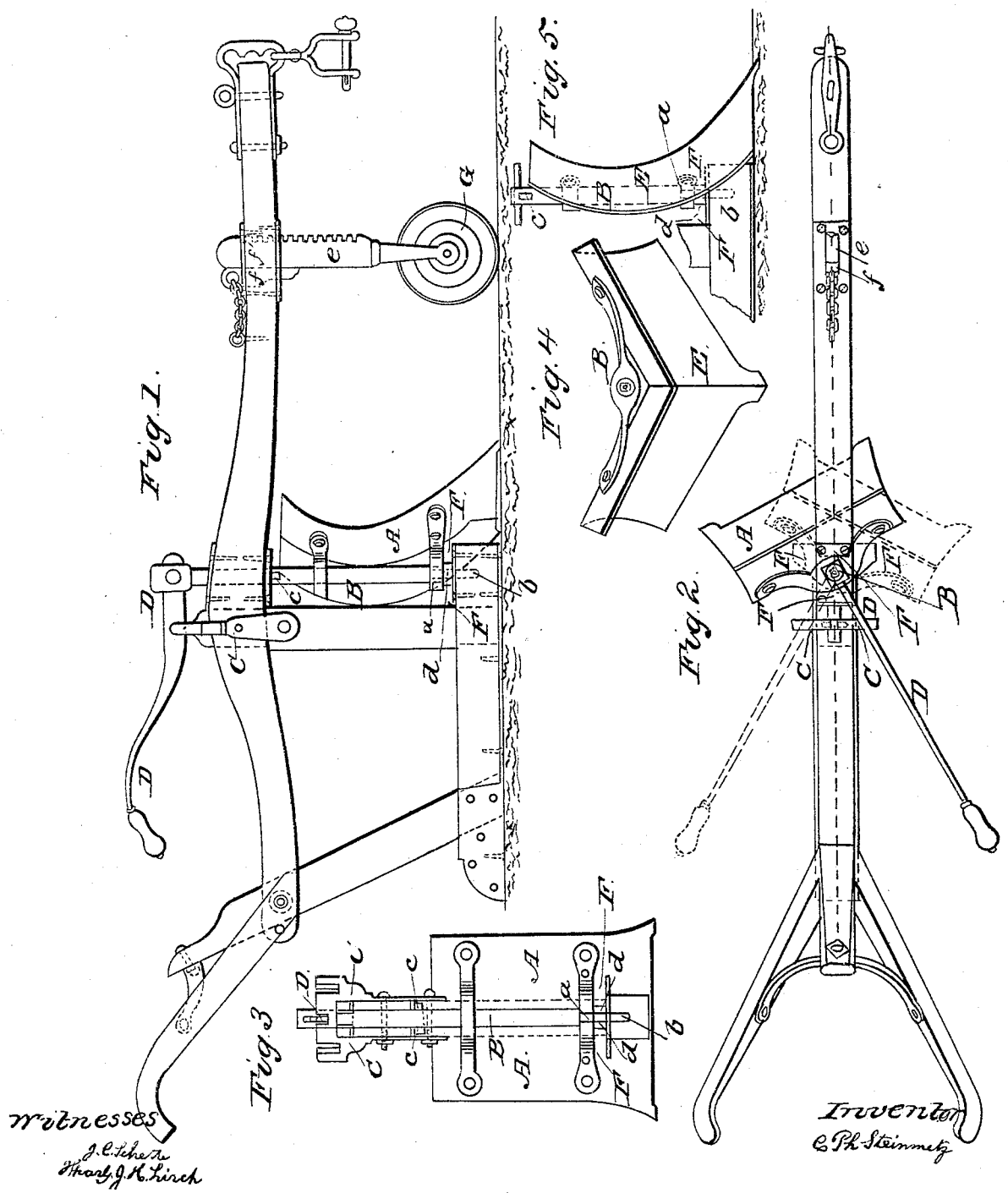

C. PH. STEINMETZ, OF MADISON, WISCONSIN.

IMPROVEMENT IN PLOWS.

Specification forming part of Letters Patent No. 78,492, dated June 2, 1868.

*To all whom it may concern:*

Be it known that I, C. PH. STEINMETZ, of Madison, in the county of Dane and State of Wisconsin, have invented a new and useful Improvement on a Plow; and I do hereby declare that the following is a full, clear, and exact description of the construction and operation of the same, reference being had to the annexed drawings, making a part of this specification, in which—

Figure 1 is a side view. Fig. 2 is a top view or ground plan. Fig. 3 is a reversible plowshare. Fig. 4 is a top view of cultivator, to be used in the same frame and with the same shaft and fixtures of plow as shown in section 3 of plowshare. Fig. 5 is a side view of cultivator.

Fig. A is a reversible plowshare. Fig. B is a shaft for plowshare and cultivator. Fig. C is a regulating-stop with three incisions or grooves. Right-and-left groove is to key plowshare in its place after it has been reversed. Middle groove is to keep cultivator stationary. Fig. D is handle to regulate stop. Fig. E is cultivator-section. Fig. F is stationary stop for cultivator, and to prevent any movement of plowshare when in use. Fig. G is a wheel which can be raised or lowered to regulate the depth of plowing, and also serves to support the plow, protects it against wearing out, and gives an easy draft in going to or returning from the field.

Fig. *a* is a square part of the shaft to keep the plowshare and cultivator more securely in its place. Fig. *b* is a bolt of the shaft inserted in the bottom timber of frame. Fig. *c* is a spring-key below top frame, to fasten shaft. Fig. *d* is a ring or collar around the upper part of bolt *b*, to prevent friction of main shaft B. Fig. *e* is regulating cog-bar or standard for wheel. Fig. *f* is key for fastening cog-bar.

The nature of my invention consists in providing a plow, first, with a wheel, as represented by Fig. G, which can be raised or lowered to regulate the depth of plowing, and which also facilitates the draft of the plow in going to or returning from the field. Second, I provide a plow with a reversible plowshare, as shown by Fig. A, which can be turned to left or right, by means of which I am enabled to turn a furrow to the same side, crossing and recrossing the field on adjoining furrows. This plowshare is further so constructed that I can lift it out of the plow; and then, third, I provide the plow with a cultivator, as shown by Fig. E, which can be used in the same frame interchangeably with the plowshare, for cultivating corn and potatoes, turning the furrow to the right and left.

The advantages which I obtain by my improvements, and which distinguishes them from other plows, are, first, that by the introduction of the wheel I protect my plow against wearing out, usual to other plows without wheel, and secure a lighter draft, and obviate any difficulty in plowing, as it can be raised or lowered; and, second, by its peculiar construction I secure the application of cultivator and plowshare to one frame; and, third, by the reversible action of the plowshare I attain a manner in plowing by far superior to the present mode of plowing with stationary plowshare.

What I claim as my invention, and desire to secure by Letters Patent, is—

1. The swivel-clevis *a*, as constructed, arranged, and fully described and shown.

2. The combination of the reversible plowshare A or cultivator-share E with the vibrating upright shaft B, lever D, and strip E, as shown and described.

3. The swivel-clevis *a*, reversible plowshare A, cultivator-share E, vibrating shaft B, lever D, stop C, notched bar or standard *e*, with wheel G, key *f*, and plates F, all constructed and arranged in combination with a plow-frame, as shown and described.

Dated Madison, Wisconsin, January 29, 1868.

C. PH. STEINMETZ.

Witnesses:
J. C. SCHETTE,
JACOB ESSEX.